US012551389B2

(12) United States Patent
Yamada et al.

(10) Patent No.: US 12,551,389 B2
(45) Date of Patent: Feb. 17, 2026

(54) WHEELCHAIR SIDE PLATE

(71) Applicant: Participant Assistive Products, San Francisco, CA (US)

(72) Inventors: Ryota Yamada, Corona, CA (US); George James King, Jr., San Francisco, CA (US)

(73) Assignee: Participant Assistive Products, San Francisco, CA (US)

( * ) Notice: Subject to any disclaimer, the term of this patent is extended or adjusted under 35 U.S.C. 154(b) by 327 days.

(21) Appl. No.: 18/319,136

(22) Filed: May 17, 2023

(65) Prior Publication Data

US 2024/0382358 A1 Nov. 21, 2024

(51) Int. Cl.
*A61G 5/10* (2006.01)
*A61G 5/12* (2006.01)

(52) U.S. Cl.
CPC ............ *A61G 5/1067* (2013.01); *A61G 5/125* (2016.11)

(58) Field of Classification Search
CPC .... A61G 5/1067; A61G 5/125; A61G 5/0866; A61G 5/10; A61G 5/1075; B62B 9/104
See application file for complete search history.

(56) References Cited

U.S. PATENT DOCUMENTS 3,784,252 A * 1/1974 Peterson ................. B62B 7/123 292/6
4,893,827 A * 1/1990 Gay ....................... A61G 5/125 297/411.39
5,257,799 A * 11/1993 Cone ......................... B62B 9/26 280/47.36
5,722,676 A * 3/1998 Wu .......................... A61G 5/00 403/403
6,032,975 A * 3/2000 Hanson ..................... A61G 5/00 280/647
6,086,086 A * 7/2000 Hanson ................ A61G 5/0883 280/650
6,715,783 B1 * 4/2004 Hanson ..................... B62B 7/10 280/47.38
7,455,362 B2 * 11/2008 Hanson ..................... A61G 5/12 297/363
7,905,504 B2 * 3/2011 Suddaby .............. A61G 5/1075 297/343
8,684,396 B1 * 4/2014 Hanson .................. A61G 5/085 280/47.4
9,010,787 B2 * 4/2015 Slagerman ........... A61G 5/1075 280/250.1
9,987,179 B2 * 6/2018 Melgarejo ............ A61G 5/1075
(Continued)

*Primary Examiner* — Steve Clemmons
(74) *Attorney, Agent, or Firm* — Morrison & Foerster LLP

(57) ABSTRACT

Provided is a wheelchair with a side plate that connects a seat and a backrest to the wheelchair frame and is configured to allow an inclination of a seat relative to the frame and an inclination of a backrest relative to the seat to be adjusted. The side plate may include a first hole configured to receive a first fastener connected to the seat. The first fastener can be inserted through the first hole and through a frame hole in the wheelchair frame to fix the inclination of the seat relative to the frame. A rear edge of the side plate may comprise a plurality of slots configured to receive a second fastener connected to the backrest. The inclination of the backrest relative to the seat may be fixed based on the slot of the plurality of slots through which the second fastener is inserted.

11 Claims, 7 Drawing Sheets

(56) References Cited

U.S. PATENT DOCUMENTS

| | | | | |
|---|---|---|---|---|
| 11,173,081 | B2 * | 11/2021 | Mulhern ................ | A47C 1/028 |
| 2004/0084950 | A1 * | 5/2004 | Markwald .............. | A61G 5/121 297/452.36 |
| 2004/0189076 | A1 * | 9/2004 | Hanson ................ | A61G 5/1067 297/440.15 |
| 2005/0029855 | A1 * | 2/2005 | Hanson ................ | A61G 5/0891 297/440.15 |

* cited by examiner

WHEELCHAIR SIDE PLATE

FIELD

Wheelchairs are an essential tool for many people living with impaired mobility. Users often spend a significant amount of time in their wheelchairs and may need to use them while performing a variety of activities. However, in many cases, different activities may be best performed from different wheelchair sitting positions. A user may not, for example, wish to watch a movie from the same position in which they would eat a meal. Accordingly, wheelchair adjustability, in particular seat adjustability, is an essential feature for ensuring a user's comfort and quality of life.

BACKGROUND

Wheelchairs are an essential tool for many people living with impaired mobility. Users often spend a significant amount of time in their wheelchairs and may need to use them while performing a variety of activities. However, in many cases, different activities may be best performed from different wheelchair sitting positions. A user may not, for example, wish to watch a movie from the same position in which they would cat a meal. Accordingly, wheelchair adjustability, in particular seat and adjustability, is an essential feature for ensuring a user's comfort and quality of life.

SUMMARY

While wheelchair adjustability can have substantial impact on a wheelchair user's wellbeing, changing the configuration of a wheelchair can be challenging. In many cases, changing a recline of a wheelchair's backrest or changing an incline of a wheelchair's seat can require partial disassembly of the wheelchair. This process can be highly technical and time-consuming and may require access to tools or personnel that the wheelchair user may lack. The complexity of the adjustable components may also increase costs associated with acquiring and owning the wheelchair, which may force many users to settle for alternative, lower quality options.

Described is a wheelchair with a side plate that allows the seat and the backrest to be independently adjusted. The side plate may connect the seat and the backrest to the frame and may enable a user to select from numerous seat incline and backrest recline angles without requiring extensive tool use or wheelchair disassembly. This may allow the wheelchair to be efficiently adapted for use in a variety of situations and environments. Enabling adjustment of both the seat and the backrest with the same component may also reduce manufacturing costs associated with the wheelchair which may, in turn, increase the wheelchair's affordability.

A wheelchair provided herein may comprise a frame connecting a plurality of wheels and comprising a plurality of frame holes, and a side plate connecting a seat and a backrest to the frame and configured to allow an inclination of a seat relative to the frame and an inclination of a backrest relative to the seat to be adjusted. The side plate may comprise a first hole configured to receive a first fastener connected to the seat. The fastener may be configured to be inserted through the first hole and through a frame hole of the plurality of frame holes, and the inclination of the seat relative to the frame may be fixed based on the frame hole of the plurality of frame holes through which the first fastener is inserted. A rear edge of the side plate may comprise a plurality of slots configured to receive a second fastener connected to the backrest. The inclination of the backrest relative to the seat may be fixed based on the slot of the plurality of slots through which the second fastener is inserted.

In some embodiments of the wheelchair, the plurality of frame holes comprises at least two frame holes.

In some embodiments of the wheelchair, the inclination of the seat relative to the frame changes by at least 5° when the first fastener is moved between adjacent frame holes of the plurality of frame holes.

In some embodiments of the wheelchair, the plurality of slots comprises at least two slots.

In some embodiments of the wheelchair, the inclination of the backrest relative to the seat changes by at least 5° when the second fastener is moved between adjacent slots of the plurality of slots.

In some embodiments of the wheelchair, the backrest is configured to fold against the seat when the second fastener is not inserted in any of the plurality of slots.

In some embodiments of the wheelchair, the side plate comprises a plurality of attachment points configured to connect to a pelvic belt.

In some embodiments of the wheelchair, the frame comprises a supporting plate configured to support the seat, wherein the side plate is attached to the supporting plate.

In some embodiments of the wheelchair, the side plate comprises an interior metal layer encased in an exterior plastic layer.

In some embodiments of the wheelchair, the wheelchair comprises an armrest.

In some embodiments of the wheelchair, the armrest is connected to a top portion of the side plate.

BRIEF DESCRIPTION OF THE FIGURES

The following figures show various views and components of a wheelchair with a side plate that enables adjustment of the wheelchair seat and the wheelchair backrest, in accordance with some embodiments. The wheelchairs and components thereof shown in the figures may, in some embodiments, have any one or more of the characteristics described herein.

DETAILED DESCRIPTION

Described is a wheelchair with a side plate that enables the wheelchair seat and the wheelchair backrest to be independently adjusted. The side plate may connect both the seat and the backrest to the frame and may allow an inclination of the seat and an inclination of the backrest to be selected from a plurality of possible inclinations. Specifically, the side plate may provide a user with indexed options for both the seat tilt and the backrest recline, ensuring that the user's wheelchair has the flexibility necessary to be adapted for effective and comfortable use for a wide range of activities in a wide range of environments.

The adjustability of the seat may be facilitated by a hole disposed in a lower edge of the side plate. This hole may be configured to receive a fastener that is attached to the seat. This fastener may, in turn, be configured to connect to the wheelchair frame at a plurality of locations. Each of these locations may correspond to a different inclination of the seat relative to the frame. Inserting the fastener through the hole in the side plate and connecting it to a location of the plurality of connection locations on the frame may fix an inclination of the seat relative to the frame.

In addition to the hole for connecting the seat to the frame, the side plate may comprise a plurality of slots disposed in its rear edge. Each of these slots may be configured to receive a second fastener that is connected to the backrest. The backrest may be attached to the side plate and configured to rotate relative to the side plate about the attachment point. Inserting the fastener connected to the backrest through a slot of the plurality of slots in the rear edge of the side plate may fix an inclination of the backrest relative to the seat.

Figure 1:
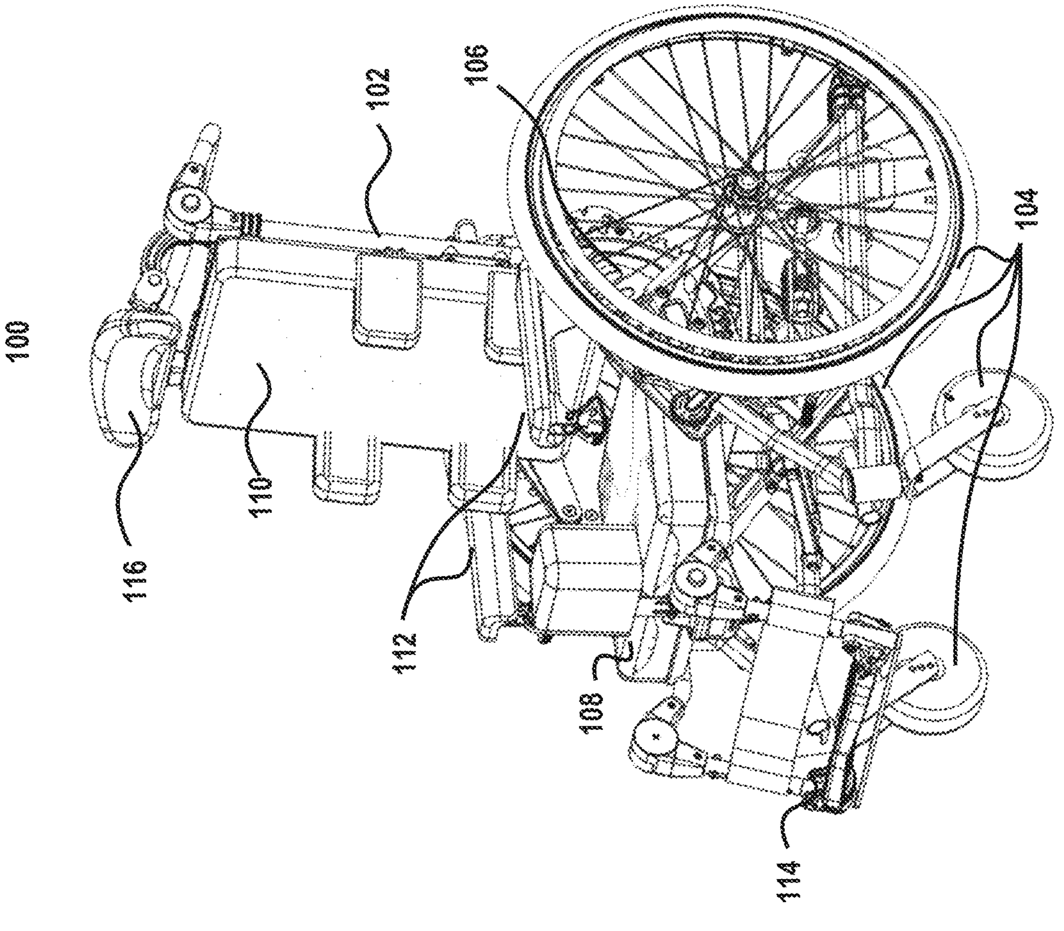
FIG. 1 shows a perspective view of a wheelchair with a side plate that enables adjustment of the wheelchair seat and the wheelchair backrest, according to some embodiments.

A perspective view of a wheelchair 100 with a side plate 106 that enables adjustment of a wheelchair seat 108 and a wheelchair backrest 110 is shown in FIG. 1. Wheelchair 100 may include a frame 102 that provides structure and support to the wheelchair components. Frame 102 may connect a plurality of wheels 104. Wheelchair 100 may be configured to be manually propelled (e.g., by manually rotating one or more of the plurality of wheels 104, either by directly moving the wheels themselves or by pushing wheelchair 100 from behind), electronically propelled (e.g., by a motor coupled to one or more of the plurality of wheels 104), or a combination thereof. For added user comfort, wheelchair 100 may optionally include a footrest 114, a headrest 116, or both.

Wheelchair 100 may include a single side plate 106 or multiple side plates 106. For example, wheelchair 100 may comprise a side plate 106 on either side of frame 102. Side plate 106 may be positioned between a side edge of seat 108 and a wheel 104 and may be configured to couple both seat 108 and backrest 110 to frame 102. Side plate 106 may be formed from a single material (e.g., a single plastic or a single metal) or may comprise two or more layers of materials. In some embodiments, side plate 106 comprises an internal metal layer covered by an external plastic layer.

Figure 2:
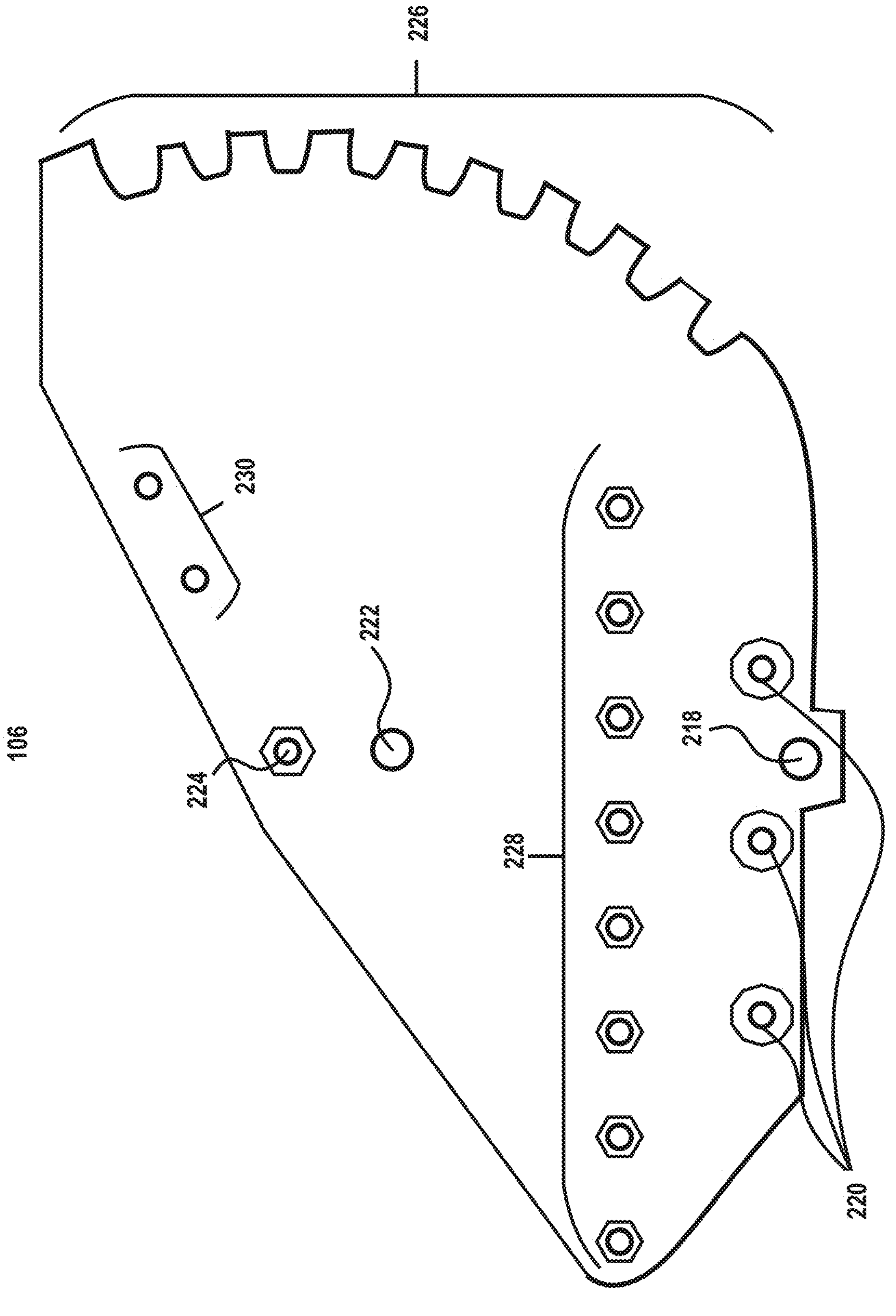
FIG. 2 shows a side plate for enabling adjustment of a wheelchair seat and a wheelchair backrest, according to some embodiments.
Figure 3:
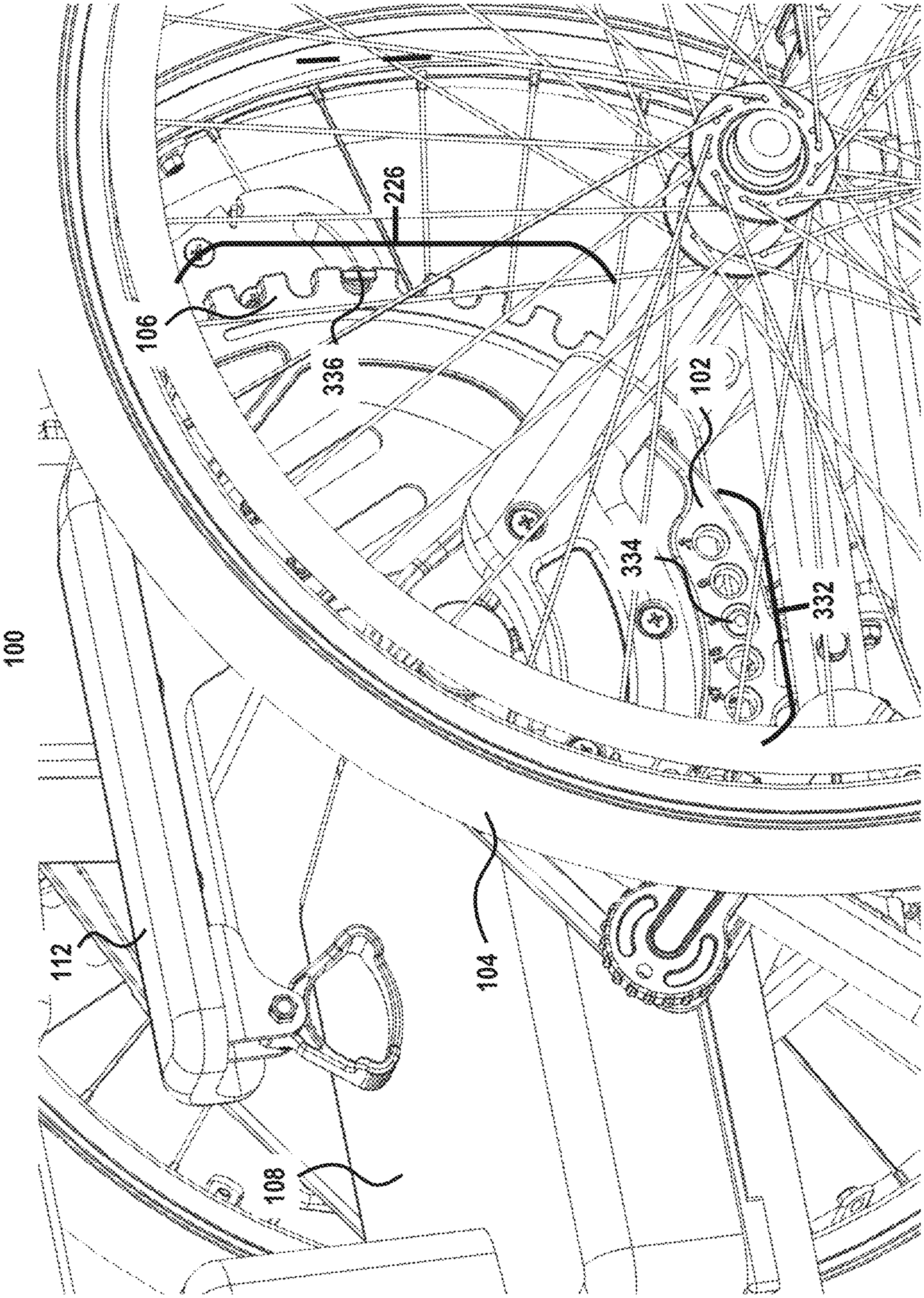
FIG. 3 shows a close-up, side view of a wheelchair with a side plate that enables adjustment of the wheelchair seat and the wheelchair backrest, according to some embodiments.

A schematic of side plate 106 is provided in FIG. 2. A lower edge of side plate 106 may comprise a hole 218 configured to receive a first fastener 334, as shown in the close-up view of wheelchair 100 provided in FIG. 3. When first fastener 334 is inserted through hole 218, portions of first fastener 334 may protrude outward away from side plate 106 on both sides of side plate 106 (e.g., on a side adjacent to seat 108 and on a side adjacent to frame 102). The portion of first fastener 334 that protrudes away from side plate 106 toward frame 102 may be configured to be inserted through a hole of a plurality of holes 332 provided in a side portion of frame 102 proximate to wheel 104.

Figure 4:
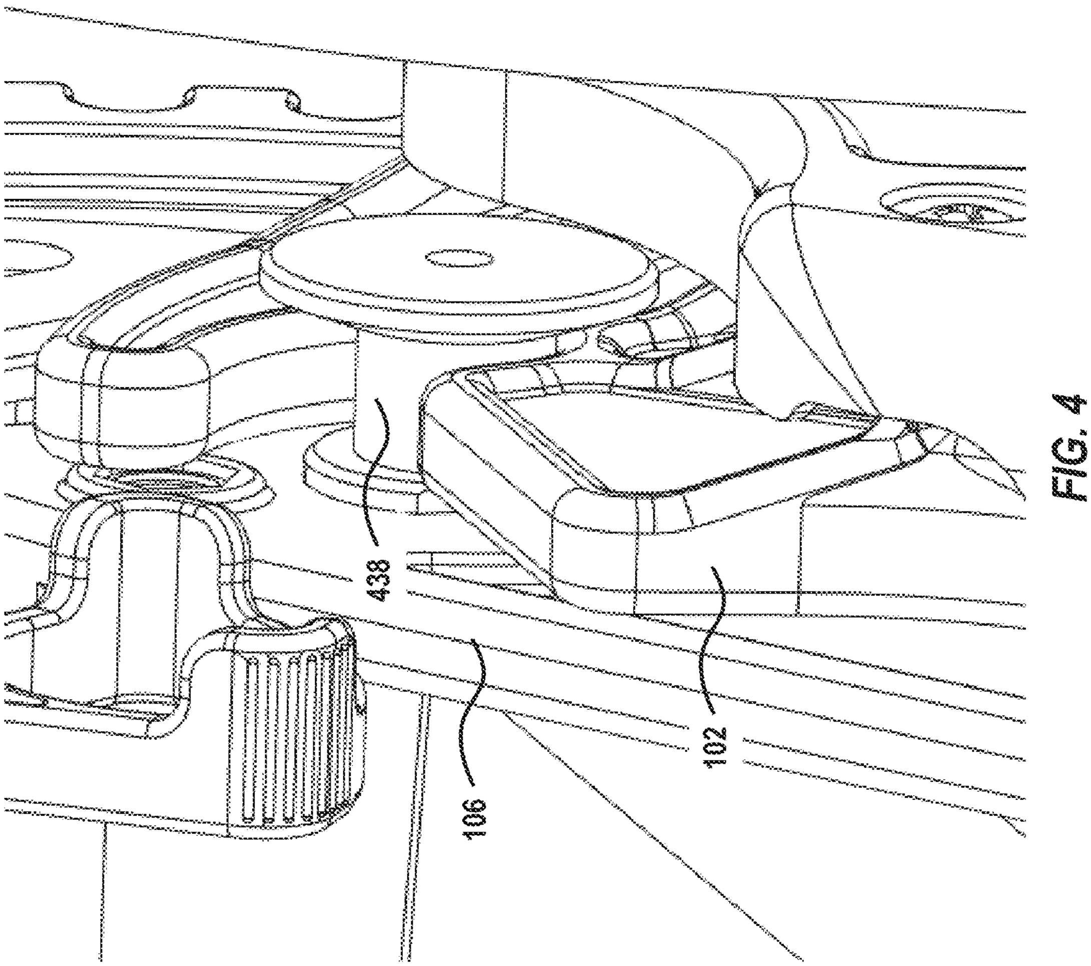
FIG. 4 shows a close-up view of a pivot between a side plate and a wheelchair frame, according to some embodiments.

A second hole 222 in side plate 106 may be configured to provide a mount for a pivot 438, as shown in FIG. 4. Side plate 106 may be configured to rotate about pivot 438 to enable the hole of the plurality of holes 332 through which first fastener 334 is inserted may be adjusted.

Figure 5:
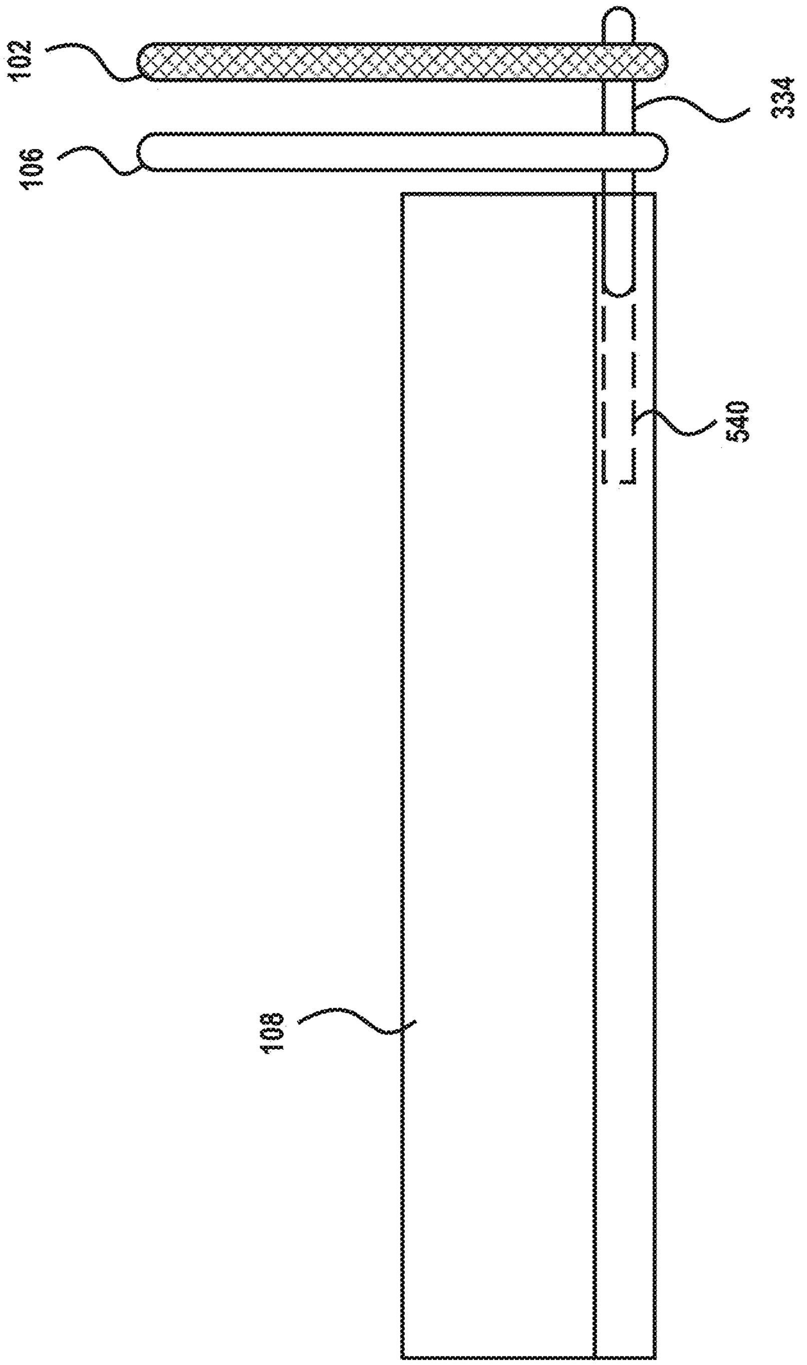
FIG. 5 shows a schematic of a connection between a wheelchair seat, a side plate, and a wheelchair frame, according to some embodiments.

The portion of first fastener 334 that protrudes away from side plate 106 toward seat 108 when first fastener is inserted through hole 218 in side plate 106 may be configured to be inserted in a cavity 540 disposed within an edge of seat 108, as shown in FIG. 5. Inserting first fastener 334 into cavity 540, through hole 218 in side plate 106, and into a hole of the plurality of holes 332 provided in frame 102 may adjustably couple seat 108 to frame 102.

The plurality of holes 332 in frame 102 may be aligned to form an arc so that changing the hole of the plurality of holes 332 through which first fastener 334 is inserted causes side plate to rotate about pivot 438 relative to frame 102. When seat 108 is connected to side plate 106 by first fastener 334, rotation of side plate 106 may cause an inclination of seat 108 relative to frame 102 to change.

To provide the wheelchair user with an indexed selection of seat inclinations, the plurality of holes 332 may be positioned such that moving first fastener 334 between adjacent holes of the plurality of holes 332 changes an inclination of seat 108 by a fixed amount. In some embodiments, moving first fastener 334 between adjacent holes of the plurality of holes 332 changes an inclination of seat 108 by about 2 degrees, about 5 degrees, about 7 degrees, about 9 degrees, about 10 degrees, about 12 degrees, about 15 degrees, or about 20 degrees. In some embodiments, moving first fastener 334 between adjacent holes of the plurality of holes 332 changes an inclination of seat 108 by greater than or equal to 1 degree, 2 degrees, 5 degrees, 7 degrees, or 9 degrees. In some embodiments, moving first fastener 334 between adjacent holes of the plurality of holes 332 changes an inclination of seat 108 by less than or equal to 45 degrees, 30 degrees, 15 degrees, 10 degrees, or 5 degrees. In some embodiments, the plurality of holes 332 comprises at least 2, at least 3, at least 4, at least 6, at least 7, at least 8, at least 9, or at least 10 holes, each of which may correspond to a unique inclination of seat 108. In some embodiments, the plurality of holes 332 comprises at most 25, at most 20, at most 15, at most 12, or at most 10 holes, each of which may correspond to a unique inclination of seat 108.

First fastener 334 may be configured to be removed entirely (i.e., removed from seat 108, side plate 106, and frame 102). Removing first fastener 334 may allow seat 108 to be detached from frame 102. This may enable wheelchair users to replace seat 108 (e.g., if seat 108 has worn out or has been damaged), to remove seat 108 for cleaning, or to remove seat 108 to facilitate transport of wheelchair 100.

Side plate 106 can include one or more auxiliary holes 220 in addition to hole 218. Each hole 220 may be configured to receive a fastener that may, in turn, be configured to couple to seat 108 to provide additional points of connection between seat 108 and side plate 106. This may ensure that seat 108 can safely bear the wheelchair user's weight without collapsing and may prevent undue strain from being placed on first fastener 334.

Figure 6:
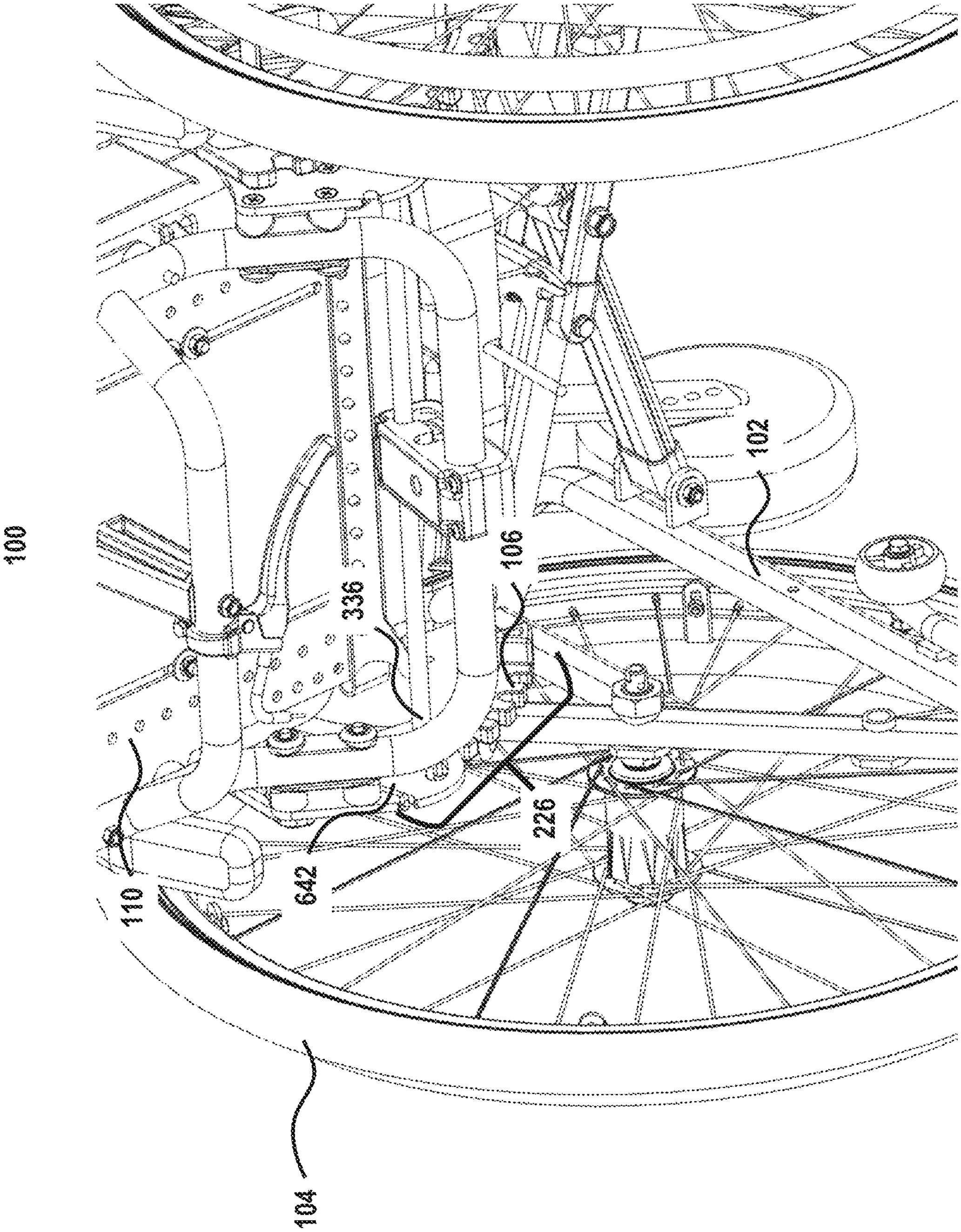
FIG. 6 shows a close-up, rear view of a wheelchair with a side plate that enables adjustment of the wheelchair seat and the wheelchair backrest, according to some embodiments.
Figure 7:
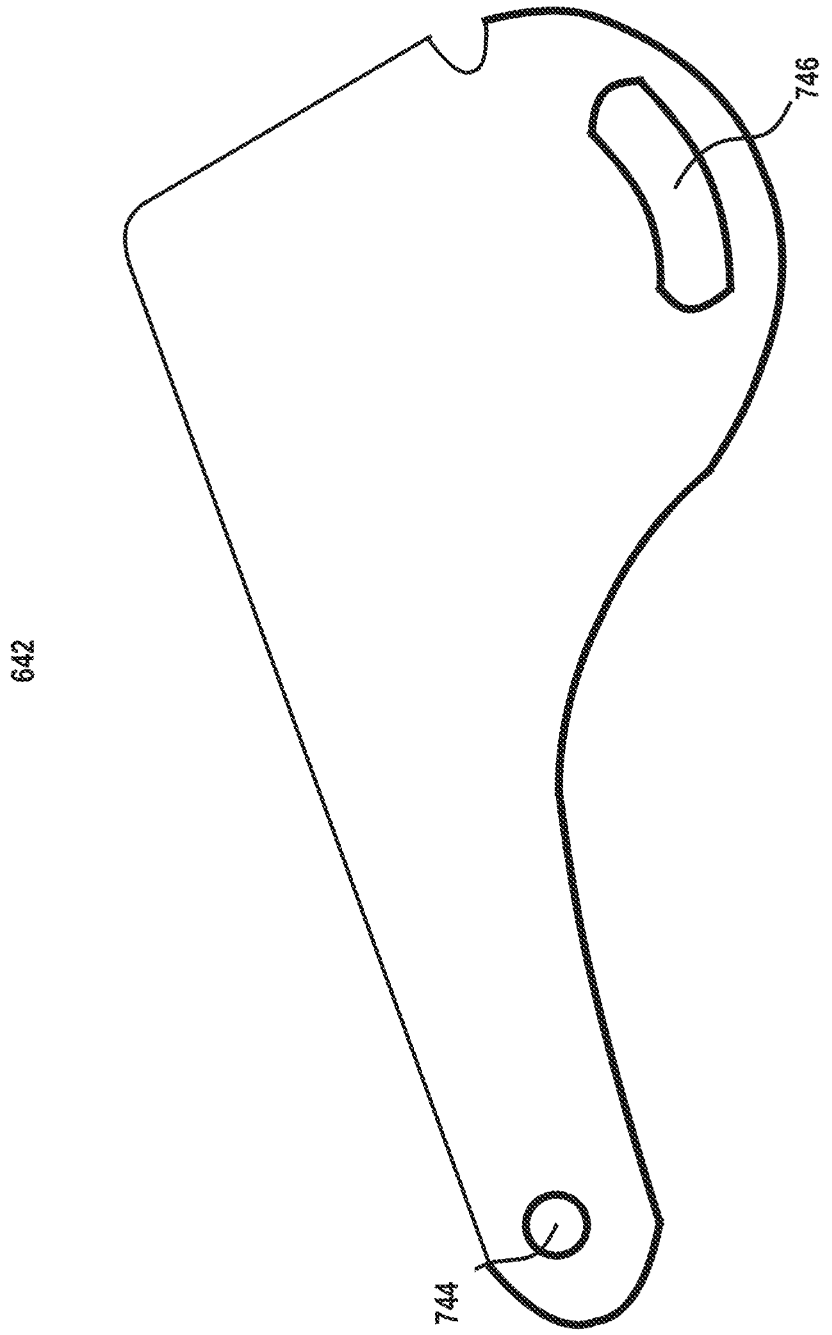
FIG. 7 shows a bracket for coupling a wheelchair backrest to a side plate, according to some embodiments.

Side plate 106 may connect a backrest of the wheelchair to the wheelchair frame via a hole 224. Hole 224 may be configured to pivotally couple to a side bracket 642 attached to a side portion wheelchair backrest 110, as shown in FIG. 6. A hole 744 corresponding to hole 224 may be disposed in side bracket 642, as shown in FIG. 7. When hole 224 and hole 744 are pivotally coupled, backrest 110 may be enabled to rotate about the connection point between side bracket 642 and side plate 106. This may allow an inclination of backrest 110 relative to seat 108 to be adjusted. The inclination of backrest 110 may be fixed by inserting a second fastener 336 (shown in FIGS. 3 and 6) through a second hole 746 in side bracket 642 and into a slot of a plurality of slots 226 disposed in a rear edge of side plate 106.

The rear edge of side plate 106 may form an arced shape. To provide the wheelchair user with an indexed selection of backrest inclinations, the plurality of slots 226 may be arranged along the rear edge of side plate 106 such that moving second fastener 336 between adjacent slots of the plurality of slots 226 changes an inclination of backrest 110 by a fixed amount. In some embodiments, moving second fastener 336 between adjacent slots of the plurality of slots 226 changes an inclination of backrest 110 by about 2 degrees, about 5 degrees, about 7 degrees, about 9 degrees, about 10 degrees, about 12 degrees, about 15 degrees, or about 20 degrees. In some embodiments, moving second fastener 336 between adjacent slots of the plurality of slots 226 changes an inclination of backrest 110 by greater than or equal to 1 degree, 2 degrees, 5 degrees, 7 degrees, or 9 degrees. In some embodiments, moving second fastener 336 between adjacent slots of the plurality of slots 226 changes an inclination of backrest 110 by less than or equal to 45 degrees, 30 degrees, 15 degrees, 10 degrees, or 5 degrees. In some embodiments, the plurality of slots 226 comprises at least 2, at least 3, at least 4, at least 6, at least 7, at least 8, at least 9, or at least 10 slots, each of which may correspond to a unique inclination of backrest 110. In some embodiments, the plurality of slots 226 comprises at most 25, at most 20, at most 15, at most 12, or at most 10 slots, each of which may correspond to a unique inclination of backrest 110.

Second fastener 336 may be configured to be moved beyond the plurality of slots 226 to allow backrest 110 to be folded toward seat 108. This may allow wheelchair 100 to be folded for storage or for transport.

First fastener 334 and second fastener 336 may be or may comprise any device configured to join or affix two or more objects. For example, first fastener 334 and/or second fastener 336 may be or may comprise bolts, pins, screws, nuts, washers, or anchors.

Side plate 106 may be configured to couple components of wheelchair 100 other than seat 108 and backrest 110 to frame 102. For example, side plate 106 can include one or more holes 228 for attaching a pelvic belt to wheelchair 100. Side plate 108 can also include a plurality of holes 230 for connecting side plate 106 to an armrest (e.g., armrest 112) of the wheelchair.

Any one or more characteristics of any of the embodiments (including claims) described, shown, and/or referenced herein may be combined, in whole or in part, with any one or more characteristics of any one or more other embodiments (including claims) described, shown, and/or referenced herein.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A wheelchair comprising:
- a frame connecting a plurality of wheels, wherein a side of the frame comprises a plurality of frame holes; and
- a side plate connecting a seat and a backrest to the frame and configured to allow an inclination of a seat relative to the frame and an inclination of a backrest relative to the seat to be adjusted, the side plate comprising:
  - a first hole configured to receive a first fastener connected to the seat, wherein a first portion of the fastener is configured to be inserted through the first hole and through a frame hole of the plurality of frame holes and a second portion of the first fastener is configured to be inserted into a cavity disposed within the seat, wherein the inclination of the seat relative to the frame is fixed based on the frame hole of the plurality of frame holes through which the first fastener is inserted, and
  - a rear edge comprising a plurality of slots configured to receive a second fastener connected to the backrest, wherein the inclination of the backrest relative to the seat is fixed based on the slot of the plurality of slots through which the second fastener is inserted.

2. The wheelchair of claim 1, wherein the plurality of frame holes comprises at least two frame holes.

3. The wheelchair of claim 1, wherein the inclination of the seat relative to the frame changes by at least 5° when the first fastener is moved between adjacent frame holes of the plurality of frame holes.

4. The wheelchair of claim 1, wherein the plurality of slots comprises at least two slots.

5. The wheelchair of claim 1, wherein the inclination of the backrest relative to the seat changes by at least 5° when the second fastener is moved between adjacent slots of the plurality of slots.

6. The wheelchair of claim 1, wherein the backrest is configured to fold against the seat when the second fastener is not inserted in any of the plurality of slots.

7. The wheelchair of claim 1, wherein the side plate comprises a linear array of attachment points configured to connect to a pelvic belt.

8. The wheelchair of claim 1, wherein the frame comprises a supporting plate configured to support the seat, wherein the side plate is attached to the supporting plate.

9. The wheelchair of claim 1, wherein the side plate comprises an interior metal layer encased in an exterior plastic layer.

10. The wheelchair of claim 1, comprising an armrest.

11. The wheelchair of claim 10, wherein the armrest is connected to a top portion of the side plate.

* * * * *